(12) United States Patent
Van Asma

(10) Patent No.: US 6,404,412 B1
(45) Date of Patent: Jun. 11, 2002

(54) PLASMA-ADDRESSED COLOR DISPLAY

(75) Inventor: Cornelis G. M. Van Asma, Eindhoven (NL)

(73) Assignee: Koninklijke Philips Electronics N.V., Eindhoven (NL)

(*) Notice: Subject to any disclaimer, the term of this patent is extended or adjusted under 35 U.S.C. 154(b) by 0 days.

(21) Appl. No.: 08/812,222

(22) Filed: Mar. 6, 1997

(30) Foreign Application Priority Data

Mar. 18, 1996 (EP) .............................................. 96200748

(51) Int. Cl.[7] .................................................. G09G 3/28
(52) U.S. Cl. .............................. 345/72; 345/60; 345/67; 365/116
(58) Field of Search ........................ 345/37, 41, 60–63, 345/72, 87, 88, 204, 67; 315/169.1, 169.4; 365/116, 112

(56) References Cited

U.S. PATENT DOCUMENTS

| 4,896,149 A | * | 1/1990 | Buzak et al. ................. 345/60 |
| 5,091,722 A | * | 2/1992 | Kitajima ....................... 345/89 |
| 5,214,521 A | * | 5/1993 | Kwon et al. ................... 345/93 |
| 5,414,440 A | * | 5/1995 | Ilcisin et al. ................. 345/100 |
| 5,523,770 A | * | 6/1996 | Tanamachi .................... 345/60 |

FOREIGN PATENT DOCUMENTS

EP  0325387 B1  7/1989

OTHER PUBLICATIONS

"A 16 Inch Full Colour Plasma–addressed Active–Matrix LCD", Digest of Technical Papers, 1993 SID International Symposium, Soc. For Info. Display pp. 883–886 by Buzak et al.

* cited by examiner

Primary Examiner—Lun-Yi Lao
(74) Attorney, Agent, or Firm—Ernestine C. Bartlett

(57) ABSTRACT

In a plasma-addressed display device according to the invention, a group (G) of three pixels (16) is constituted out of one common data electrode (18) and a group of plasma channels (20). The colour filters are aligned with the plasma channels (20) of the group. In this way the number of data electrodes (18) and thus the number of connections thereto reduces by a factor equal to the number of pixels (16) in a group (G). The number of plasma channels (20) increases with the same factor, but the total number of connections decreases as the number of rows is lower than the number of groups (G) of pixels (16).

2 Claims, 3 Drawing Sheets

PLASMA-ADDRESSED COLOR DISPLAY

BACKGROUND OF THE INVENTION

This invention relates to a plasma-addressed colour display device comprising: a layer of electro-optical material sandwiched between elongated data electrodes and plasma channels to obtain a matrix structure of pixelelements, and colour filters being associated with the pixelelements for obtaining groups of adjacent pixelelements representing different colours enabling display of a colour picture.

The publication "A 16 Inch Full Colour Plasma-addressed Active-Matrix LCD", Digest of Technical Papers, 1993 SID International Symposium, Soc. for Info. Display pp. 883–886 by Buzak et al., discloses a plasma-addressed liquid crystal display, commonly referred to as "PALC" display device, more specifically a colour PALC display device. The known PALC display device comprises: a first substrate on which parallel transparent column electrodes are deposited, a second substrate which has parallel sealed plasma channels corresponding to rows of the display, and a liquid crystal material (LC-material) sandwiched between the substrates. Each of the plasma channels of the second substrate is filled with a low pressure ionizable gas, such as helium, and contains spaced cathode and anode electrodes along the channel for ionizing the gas to create a conductive plasma. The channels are closed off by a thin transparent dielectric sheet. Each of the plasma channels crosses all of the column electrodes to form a matrix of overlapping regions. The overlapping regions correspond to pixelelements of the electro-optical material.

The operation of the PALC display device is elucidated below. The plasma channel acts as a row switch capable of selectively addressing a row of liquid crystal pixel elements (LC-pixels). Successive lines of data signals representing an image to be displayed are sampled at column positions and the sampled data voltages are respectively applied to the column electrodes. All but one of the row plasma channels are in the deionized or non-conducting state. The plasma of the one ionized selected plasma channel is conducting and, in effect, establishes a reference potential on the adjacent side of a row of LC-pixels, causing each LC-pixel to charge to the difference of the reference potential and the column potential. Then, the ionized channel is turned off for isolating the LC-pixel charge and storing the data voltage for a frame period. When the next row of data appears on the column electrodes, only the succeeding plasma channel row is ionized to store the data voltages in the succeeding row of LC-pixels, and so on. As is well known, the attenuation of each LC-pixel to backlight or incident light is a function of the stored voltage across the pixel.

The plasma channels can be activated successively, for example by applying successively a large voltage pulse to the anode electrodes, whereby each of the cathode electrodes is coupled to a reference voltage.

To obtain a colour display, colour filters are provided representing three primary colours. The colour filters each are spatially aligned with a corresponding one of the data columns. Each intersection of one plasma channel extending in the row direction with three data columns (one for red, green, and blue) extending in the column direction defines a full colour pixel. In this way groups of three adjacent LC pixels are obtained of which each pixel is associated with another of the primary colours.

The known display device has as a drawback that many data drivers are needed to supply the data signals to the data columns.

OBJECTS AND SUMMARY OF THE INVENTION

It is an object of the invention to provide a display device of which a total number of drivers is decreased.

An aspect of the invention is characterized in that the display device is adapted to comprise groups of pixelelements each being constituted with a common data electrode cooperating with a group of plasma channels, the colour filters being aligned with the plasma channels. The groups of pixelelements form a full colour pixelelement. A group of pixelelements is constituted out of one data electrode extending in the column direction and a group of plasma channels extending in the row direction instead of one plasma channel extending in the row direction and a group of data electrodes each extending in the column direction. Different colour filters are aligned with each of the plasma channels of the group. So, the colour filters now extend in the row direction instead of the column direction. The number of plasma channels and colour filters in a group may be three such that each of the colour filters represent a primary colour. In this case, the number of data electrodes and thus the number data drivers connected thereto reduces by a factor three, and the number of plasma channels increases with a factor three. The total number of drivers decreases if in the known PALC display the number of colour pixelelements in a row (so, the number of data electrodes divided by three) is larger than the number of rows (which are the plasma channels). This is usually the case as in most display panels the number of pixelelements in a row is larger than the number of rows. As an example, suppose a known PALC display device with an 3:4 aspect ratio has 600 rows (plasma channels) and 3*800 columns (data electrodes). The total number of drivers is not less than 3000, viz. 600 pulse drivers connected to the anode electrodes (all the cathode electrodes may be interconnected to receive the reference voltage, as will be further explained below) and 2400 data drivers connected to the data electrodes. The PALC display device according to the invention comprises 800 data columns and 3*600 plasma channels. The total number of drivers is only 2600, viz. 3*600 for the anode and cathode electrodes and 800 for the data electrodes.

In accordance with an embodiment of the invention an advantageous way of driving the plasma-addressed colour display device will be described. In the known PALC display a video signal has to be processed into data signals representing three primary colours (usually: red, green, blue). The data signals are supplied to corresponding data electrodes via a data driver circuit. The data driver circuit supplies the data signals associated with the different colours in parallel to all column electrodes. The plasma channels are selected one by one via a plasma driver circuit and thus a row of pixels corresponding to the selected plasma channel will be charged. A common plasma channel cooperates with a group of three data electrodes to obtain a full colour pixel. In contrast with the known PALC display, the plasma driver circuit according to the invention is adapted to select the plasma channels in a group one by one. The data driver circuit according to the invention is adapted to supply the data signals belonging to the group of colours one by one to the common data electrode such that the data of a specific colour is presented to the activated plasma channel associated to a colour filter corresponding to that colour.

In accordance with another embodiment of invention, a further reduction of the total number of drivers is reached.

EP-B-0,325,387 shows that the number of drivers needed to drive a PALC display panel decreases by taking together in groups both the anode and the cathode electrodes. In EP-B-0,325,387 two possibilities are disclosed to select the plasma channels 30 one by one. The first possibility shows that one electrode of each plasma channel is connected to a reference potential. So, all these electrodes can be interconnected to receive the reference potential. The remaining electrode of each plasma channel is connected to a pulse driver supplying a pulse signal. The plasma channels are selected one by one by supplying one pulse signal with a voltage pulse which has a value with respect to the reference voltage that is large enough to ionize the plasma, while all other pulse signals supply a voltage which has a value with respect to the reference voltage that is too low to ionize the plasma. Assuming a PALC display device with N rows of pixels, N pulse drivers are needed to drive the supply the pulse signals to the anodes, and N+1 connections are needed to supply the N pulse signals and the one reference signal to the panel if the all cathodes are interconnected on the PALC display panel. The second possibility shows that the number of drivers needed to drive a PALC display panel decreases by taking together in groups both the anode and the cathode electrodes. The groups are chosen such that each of the anode groups includes no more than one electrode of each of the cathode groups, and in the same way, each of the cathode groups includes no more than one electrode of each of the anode groups. The adjacent cathode-anode electrode pairs are each located in one channel, and the channels whose electrodes form any one of a first group thus include no more than one electrode of any one of the second group. Assuming again a PALC display device with N rows of pixels, both the cathode and anode electrodes are taken together in groups of $N^{1/2}$ lines, with one pulse driver per group. This leads to $2N^{1/2}$ instead of N pulse drivers, and if the connections in each of the groups are made on the PALC display panel to $2N^{1/2}$ instead of N+1 connections.

Although this way of grouping the anode and cathode electrodes is very efficient a lot of other possibilities exist to group the anode and cathode electrodes whereby the demands formulated above are satisfied. Then still the number of pulse drivers decreases, but to a lesser extent. It may be advantageous to group less than the maximal allowable $N^{1/2}$ electrodes to lower the capacitive load of the pulse driver connected to such a group of electrodes.

As for the ignition of the plasma it is only important to supply a large enough voltage difference between the anode and cathode electrodes it is possible to interchange the position of the anode and cathode electrodes. Therefor these electrodes are also referred to as first and second electrodes.

As an example, suppose a PALC display having the known structure has 1200 rows (plasma channels) and 3*1600 columns (data electrodes, 1600 for each colour). The total number of drivers needed to drive the PALC display panel is not less than about 4870, viz. $2*1200^{1/2}$ for the anode and cathode groups and 4800 for the data electrodes. A corresponding PALC display has 3*1200 plasma channels and 1600 data electrodes. The total number of connections is only about 1720, viz. $2*(3*1200)^{1/2}$ for the anode and cathode groups and 1600 for the data electrodes.

As an other example, suppose a PALC display having the known structure has 600 rows (plasma channels) and 3*400 columns (data electrodes, 400 for each colour). The total number of drivers needed is not less than about 1250, viz. $2*600^{1/2}$ for the anode and cathode groups and 1200 for the data electrodes. A corresponding PALC display has 3*600 plasma channels and 400 data electrodes. The total number of drivers needed is only about 486, viz. $2*(3*600)^{1/2}$ for the anode and cathode groups and 400 for the data electrodes.

So, even if a PALC display panel with a known structure has a number of colour pixels in a row (400 in the above example) not larger than the number of rows (600 in the above sample) the total number of drivers of a PALC display decreases. The actual amount of decrease of the number of drivers is also dependent on the way the anode and cathode electrodes are grouped. The decrease will be less if less than the maximal allowable $N^{1/2}$ electrodes are grouped.

Besides lowering the number of data drivers, also the number of data electrodes decreases and thus the spacing between the connections to the data electrodes becomes larger which is more economical and more reliable. A negative consequence of the invention is that the number of plasma channels increases a factor three, and the time available for igniting the plasma channels and the time available to charge the pixels decreases by a factor three. But, the advantages reached by the decreased number of data electrodes outweigh these disadvantages.

The invention may offer even a more substantial decrease in the total number of connections for the new displays with an aspect ratio of 16:9 in which the number of pixels in a row is likely to be even much more larger than the number of rows.

These and other aspects of the invention will be described and elucidated with reference to the accompanying drawings.

DESCRIPTION OF THE PREFERRED EMBODIMENTS

Figure 1:
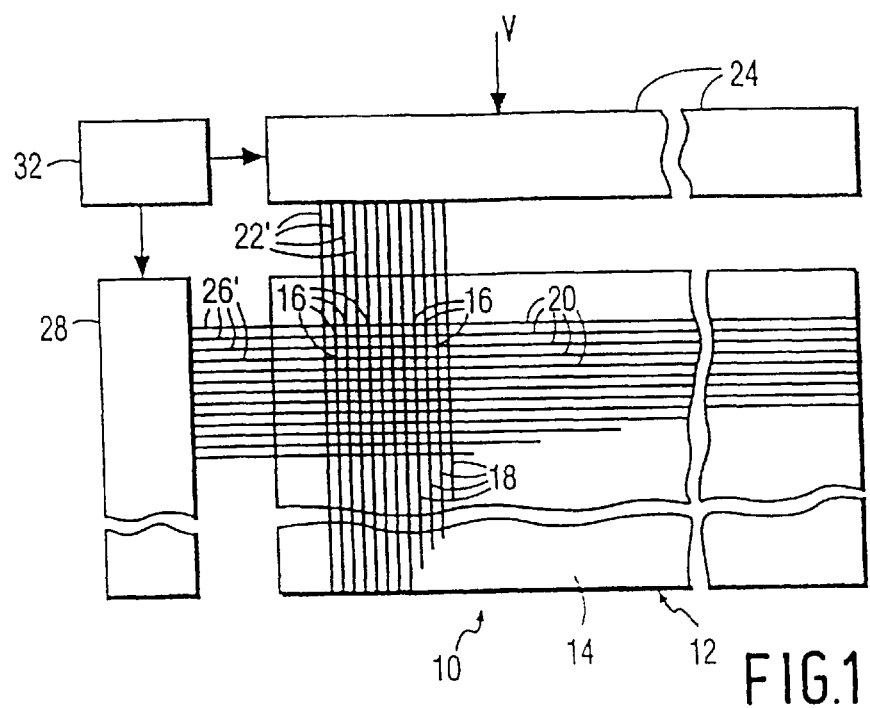
FIG. 1 is a schematic block diagram of a conventional flat panel display system.
Figure 2:
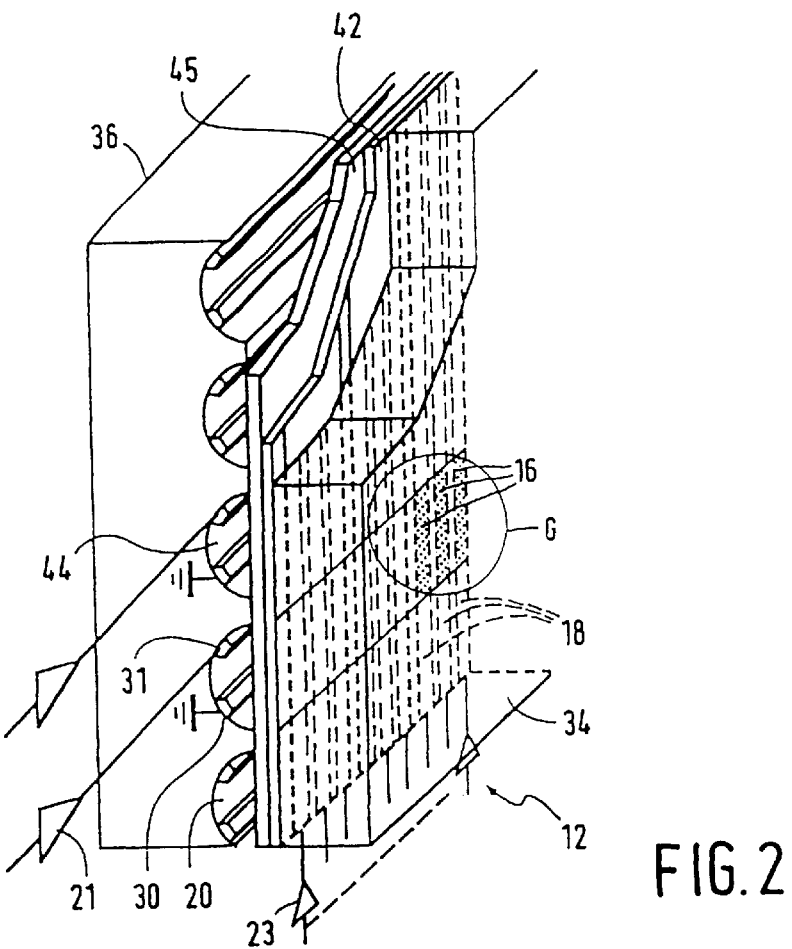
FIG. 2 is a perspective view of part of a conventional colour PALC display device.

FIG. 1 and FIG. 2 are used in combination to explain the construction and the electronic circuitry to drive a conventional PALC display. FIG. 1 shows a flat panel display system 10, which represents a typical PALC display device. The flat panel display system comprises a display panel 12 having a display surface 14 which contains a pattern formed by a rectangular planar array of nominally identical data storage or display elements 16 (also referred to as pixels) mutually spaced apart by predetermined distances in the vertical and horizontal directions. Each display element 16 in the array represents the overlapping portions of thin, narrow electrodes 18 arranged in vertical columns and elongate, narrow plasma channels 20 arranged in horizontal rows. (The electrodes 18 are hereinafter also referred to as "column electrodes"). The display elements 16 associated with one of the channels 20 represent one line of data of a video information V.

The widths of column electrodes 18 and channels 20 determine the dimensions of display elements 16, which are typically of rectangular shape. Column electrodes 18 are deposited on a major surface of a first electrically nonconductive, optically transparent substrate 34 (see FIG. 2), and the plasma channel rows are usually built into a second transparent substrate 36. An electro-optical material 42 such as a liquid crystal (LC) material is located between the substrates 34 and 36. Skilled persons will appreciate that certain systems, such as reflective displays of either the direct view or projection type, would require that only one substrate is optically transparent.

The column electrodes 18 receive data drive signals developed on parallel output conductors 22' by output amplifiers 23 (FIG. 2) of a data driver circuit 24 which receives the video information V. The channels 20 receive data strobe signals of the voltage pulse type developed on parallel output conductors 26' by output amplifiers 21 (FIG. 2) of a plasma driver circuit 28. A cathode electrode 30 (FIG. 2) and an anode electrode 31 are provided in each of the channels 20.

To synthesize an image on the entire area of display surface 14, display system 10 employs a scan control circuit 32 that coordinates the functions of the data driver circuit 24 and the plasma driver circuit 28 so that all columns of display elements 16 of display panel 12 are addressed row by row. Display panel 12 may employ electro-optical materials 42 of different types. For example, if it uses such material that changes the polarization state of incident light rays, display panel 12 is positioned between a pair of light polarizing filters, which cooperate with display panel 12 to change the luminance of light propagating through them. The use of a scattering liquid crystal cell as the electro-optical material would not require the use of polarizing filters, however. All such materials or layers of materials which attenuate transmitted or reflected light in response to the voltage across it are referred to herein as electro-optical materials. Liquid crystal (LC) materials are presently the most common example, the detailed description will refer to LC materials but it will be understood that the invention is not limited to display panels with liquid crystal materials.

FIG. 2 illustrates a PALC display panel using LC material. Only a few column electrodes 18 and plasma channels 20 are shown. The rows of the PALC display panel are constituted by a plurality of parallel elongated sealed plasma channels 20 underlying a layer 42 of the LC material. Each of the plasma channels 20 is filled with an ionizable gas 44, is closed off with a thin dielectric sheet 45 typically of glass, and contains on an interior channel surface first and second spaced elongated electrodes 30, 31 which extend the full length of the channel. The first electrode 30 in the prior art arrangement is typically grounded and is commonly called the cathode. The second electrode 31 is called the anode, because a positive strobe pulse sufficient to cause electrons to be emitted from the cathode electrode 30 to ionize the gas will typically be supplied relative to the cathode electrode 30. As explained above, each plasma channel 20, in turn, has its gas ionized with a strobe pulse to create a plasma. The ionized plasma has a low conductivity and connects a reference potential to a row of pixels in the LC layer 42 above. When the strobe pulse terminates, and after deionization has occurred, the next plasma channel 20 is strobed and turned on. Since the column electrodes 18 each cross a whole column of pixels, only one plasma channel 20 at a time is allowed to be active (in the conductive state) to avoid crosstalk.

Colour filters (not shown) aligned with each of the column electrodes 18 may be positioned within display panel 12 to develop multi-coloured images of controllable colour intensity. In FIG. 2 three colour filters transmitting each a different primary colour are associated with three adjacent column electrodes 18 to obtain groups G of three display elements or pixels 16. For a projection display, colour can also be achieved by using three separate monochrome panels 12, each of which controls one primary colour. In this case the width of the column electrodes 18 could be larger than shown in FIG. 2 to obtain predominantly square pixels 16.

Figure 3:
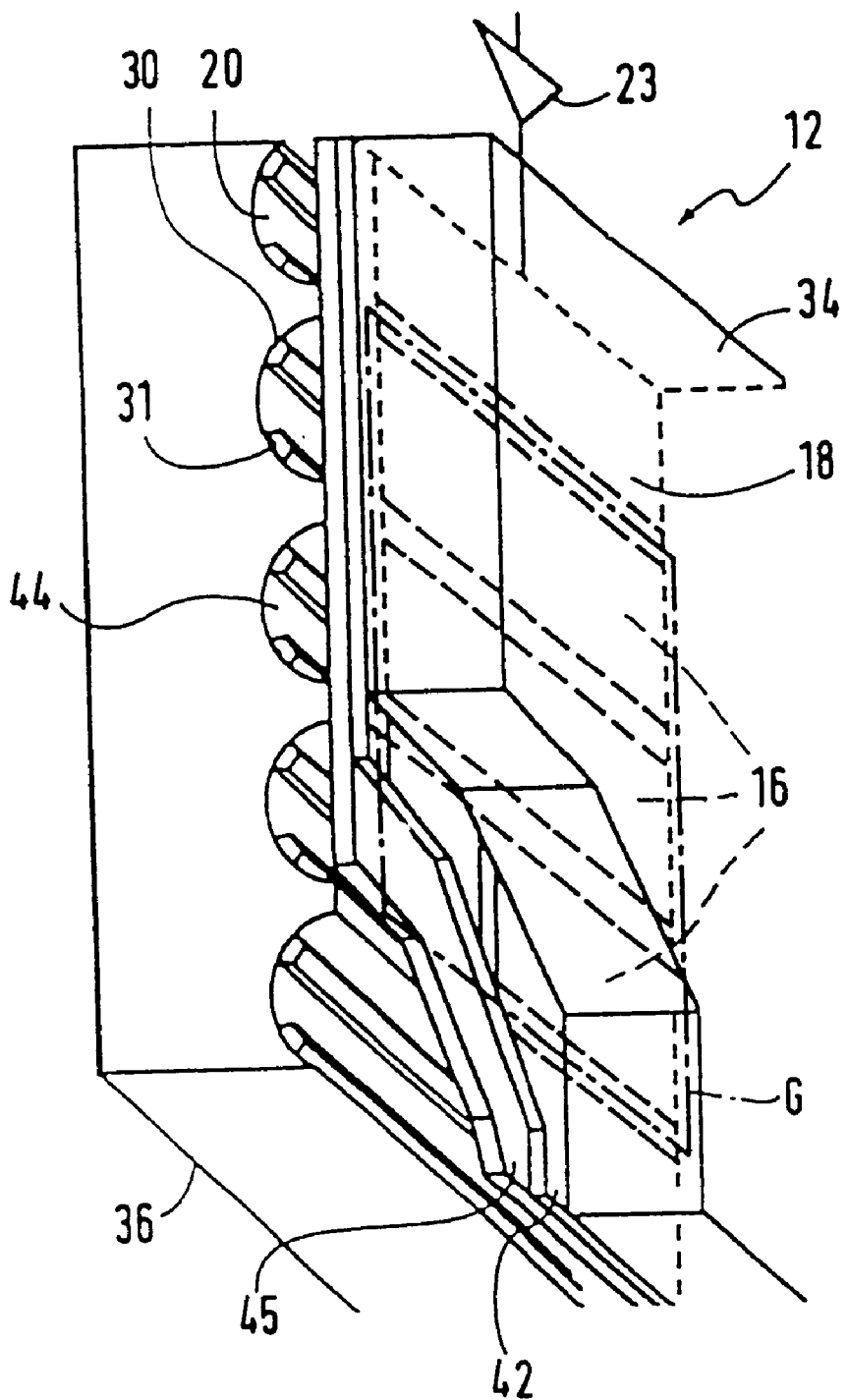
FIG. 3 is a perspective view of part of a colour PALC display device according to the invention.

FIG. 3 is a perspective view of part of a PALC display device according to the invention. The same reference numerals are referring to the same elements as in FIG. 2. The PALC colour display device of FIG. 2 is adapted such that a group G of pixels 16 is now constituted by three adjacent plasma channels 20 extending in the row direction and one associated data electrode 18 extending in the column direction. The number of data electrodes 18 and thus the number of drivers and connections thereto decrease with a factor three. The number of plasma channels 20 increases by a factor three, but as the number of rows is lower than the number of pixel triplets in one row the total number of drivers and connections decreases.

Figure 4:
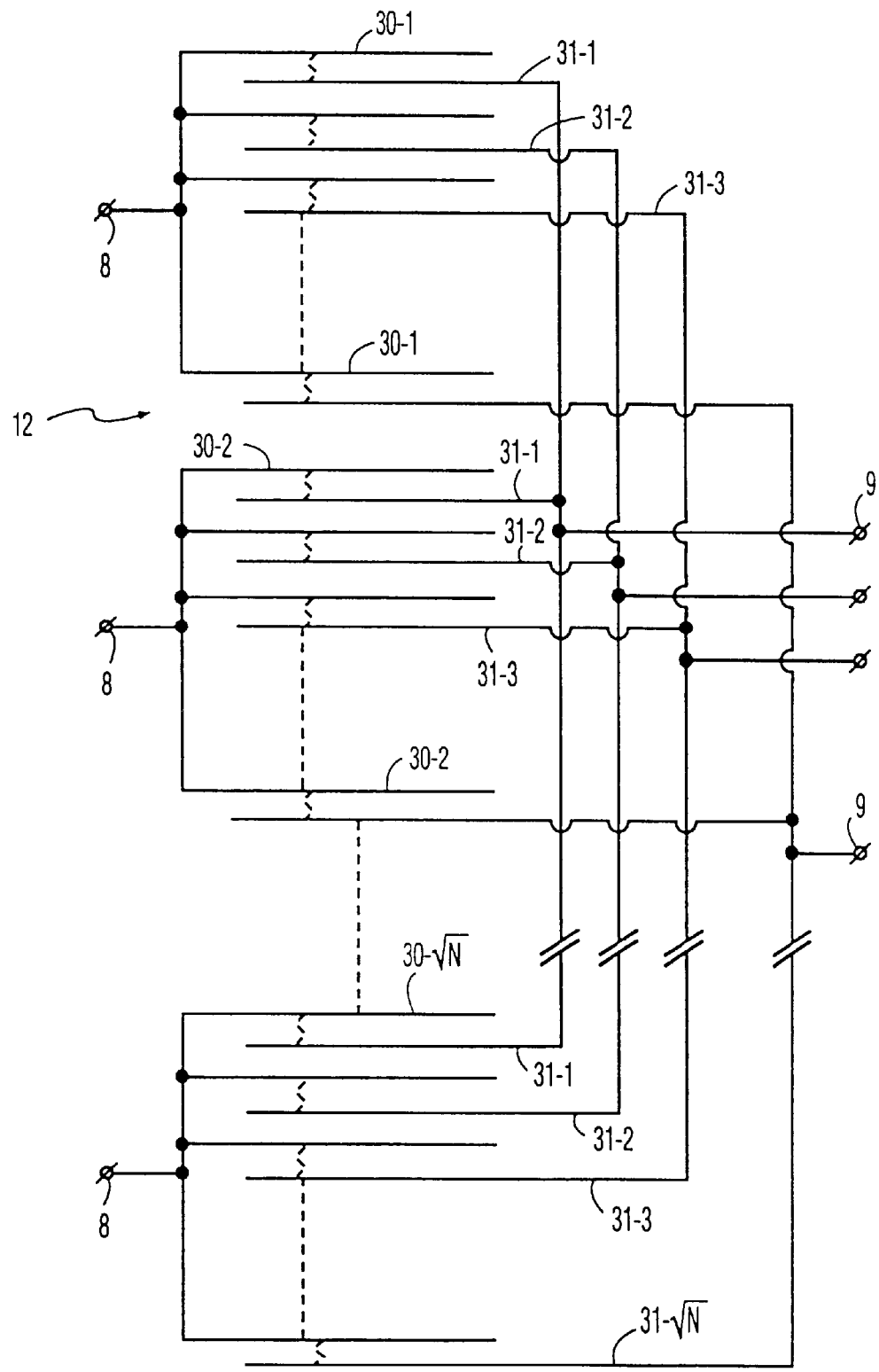
FIG. 4 is a circuit schematic of a known arrangement of channel cathode and anode electrode connections into plural groups.

FIG. 4 is a circuit schematic of a known arrangement of channel cathode 30-1, . . . , 30-√N and anode 31-1, . . . , 31-√√N electrode connections into plural groups. The number of pulse drivers coupled to the connections 8, 9 to a PALC display panel 12 decreases by taking together in groups both the cathode electrodes 30-1, . . . , 30-√N and the anode electrodes 31-1, . . . , 31-√N, such that each of the cathode groups 30-1, . . . , 30-√N includes no more than one electrode of each of the anode 31-1, . . . , 31-√N groups, and in the same way, each of the anode groups 31-1, . . . , 31-√N includes no more than one electrode of each of the cathode groups 30-1, . . . , 30-√N. Adjacent cathode-anode electrode pairs are located in one plasma channel 20, and the plasma channels 20 whose electrodes form any one of a first group thus include no more than one electrode of any one of the second group. The anode and cathode electrodes may be interconnected on the PALC display panel (as shown) to also reduce the number of connections of the PALC display panel. Assuming such a PALC display device with N rows of pixels, both the cathode electrodes 30-1, . . . , 30-√N and anode electrodes 31-1, . . . , 31-√N are taken together in groups of $N^{1/2}$ lines, with one connection 8, 9 per group. This leads to $2N^{1/2}$ connections 8, 9 (instead of N+1 connections) to the output conductors 26'.

In the following, a primary aspect of the invention is phrased in other words. A known plasma-addressed electro-optical display device comprises a layer of electrooptical material 42, data electrodes 18 coupled to the electro-optical layer 42 to receive data voltages for activating portions of the electro-optical layer 42, and a plurality of plasma channels 20 extending in a row direction generally transverse to the data electrodes 18 extending in a column direction. To obtain a colour display, colour filters are provided representing three primary colours. The colour filters each are spatially aligned with a corresponding one of the data electrodes 18. Each intersection of one plasma channel 20 with three data electrodes 18 (one for red, green, and blue) defines a group G of pixels 16. In this way groups G of three adjacent LC-pixels 16 are obtained of which each pixel 16 is associated with another of the primary colours.

In a plasma-addressed display device according to an embodiment of the invention, a group G of pixels 16 is constituted out of one data electrode 18 extending in the column direction and a group of plasma channels 20 extending in the row direction. The different colour filters are aligned with a corresponding plasma channels of the group. So, the colour filters now extend in the row direction instead of the column direction.

Assuming that three plasma channels are present in each group of plasma channels, the plasma driver circuit 28 has to be adapted to select the three plasma channels 20 in a group one by one, and the data driver circuit 24 has to be adapted to supply the data signals belonging to the three colours one by one to the common data electrode 18 such that the data of a specific colour is presented to the activated plasma channel 20 associated to a colour filter corresponding to that colour. In this way the number of data electrodes 18 (in the row direction) and thus the number of connections thereto and the number of drivers coupled to these connections reduces by a factor three. The number of plasma channels 20 (in the column direction) increases with a factor three, but the total number of connections decreases as the number of rows is lower than the number of groups of pixels.

The invention can be used in all kinds of PALC displays, such displays typically have a small channel pitch for use in computer monitors, workstations or TV applications.

It is also possible to transpose the PALC display panel according to the invention such that the common data electrode extends in the row direction and the plasma channels in a group extend in the column direction.

While the invention has been described in connection with preferred embodiments, it will be understood that modifications thereof within the principles outlined above will be evident to those skilled in the art and thus the invention is not limited to the preferred embodiments but is intended to encompass such modifications. Any reference signs in the following claims shall not be construed as limiting the claims.

What is claimed is:

1. A plasma-addressed colour display device comprising:
   a layer of electro-optical material (42) sandwiched between elongated data electrodes (18) and plasma channels (20) to obtain a matrix structure of pixelelements (16), and colour filters being associated with the pixelelements (16) for obtaining groups (G) of adjacent pixelelements (16) representing different colours enabling display of a colour picture, characterized in that the display device is adapted to comprise groups (G) of pixelelements (16) each being constituted with a common data electrode (18) cooperating with a group of plasma channels (20), the colour filters being aligned with the plasma channels (20);

wherein the plasma-addressed colour display device further comprises:

a plasma driver circuit (28) coupled to selectively activate the plasma channels (20) in a group for selecting pixelelements (16) associated with the activated plasma channel (20), and a data driver circuit (24) receiving a video information V, and supplying colour data signals each representing one of a group of primary colours to the common data electrode (18) one by one, wherein a colour data signal being supplied to the common data electrode (18) represents the primary colour corresponding to a colour of the colour filter of the activated plasma channel (20).

2. A plasma-addressed colour display device as claimed in claim 1, characterized in that each plasma channel (20) comprises spaced first (31) and second (30) electrodes, the first electrodes (30) being interconnected in a number of first groups and the second electrodes (31) being interconnected in a number of second groups such that each of the first groups includes no more than one electrode of each of the second groups.

* * * * *

UNITED STATES PATENT AND TRADEMARK OFFICE
CERTIFICATE OF CORRECTION

PATENT NO.    : 6,404,412 B1                                                              Page 1 of 1
DATED         : June 11, 2002
INVENTOR(S)   : Cornelius, Van Asma GM It is certified that error appears in the above-identified patent and that said Letters Patent is hereby corrected as shown below:

Title page,
Item [*] Notice, delete "0" and insert -- 592 --.

Signed and Sealed this

Thirtieth Day of August, 2005

JON W. DUDAS
*Director of the United States Patent and Trademark Office*